United States Patent [19]

Mixan

[11] 4,168,174
[45] Sep. 18, 1979

[54] MARINE ANTIFOULANT PROCESSES

[75] Inventor: Craig E. Mixan, Midland, Mich.

[73] Assignee: The Dow Chemical Company, Midland, Mich.

[21] Appl. No.: 881,469

[22] Filed: Feb. 27, 1978

[51] Int. Cl.$^2$ .............................................. C09D 5/14
[52] U.S. Cl. ................................. 106/15.05; 106/16; 106/239; 106/241; 260/27 R; 260/32.8 R; 260/33.6 UA; 260/42
[58] Field of Search ............... 106/15 R, 16, 239, 241

[56] References Cited

U.S. PATENT DOCUMENTS

| | | | |
|---|---|---|---|
| 3,825,548 | 7/1974 | Kurihara et al. | 260/294.8 B |
| 4,022,906 | 5/1977 | Sidi et al. | 106/15 R |

OTHER PUBLICATIONS

Foye et al., *Jour. of Pharmaceutical Sciences*, vol. 64, No. 2 (Feb. 1975), pp. 211-216.

*Primary Examiner*—Lorenzo B. Hayes

[57] ABSTRACT

Processes for preventing marine fouling which employ either p-Dithiino(2,3-b)pyrazine-2,3-dicarbonitrile, 1,3-Dithiolo(4,5-b)pyrazin-2-ylidene-propanedinitrile or mixtures thereof.

3 Claims, No Drawings

MARINE ANTIFOULANT PROCESSES

BACKGROUND OF THE INVENTION

The difficulties encountered due to marine fouling are well documented in the literature. Slow moving and stationary surfaces that are exposed to marine environments become fouled because of the presence of various marine organisms including barnacles, Limnoria, various algal forms, etc. In this regard it is well known that such organisms attach themselves to concrete, wood and metal pier pilings, ship bottoms and the like and that removal of such organisms often requires expensive mechanical scraping or sandblasting. Certain organotin compounds, especially bis(tri-n-butyl)tin oxide, have been used as anti-fouling additives for coating compositions. However, coating compositions containing organotin oxides need to be re-applied periodically after immersion in a marine environment. For this reason, a continued search has been made for a compound or compounds which would have marine antifoulant activity at relatively low concentration levels while remaining effective as a marine antifoulant for long periods of time without being leached out by water or rain. It has now been unexpectedly discovered that the compound p-Dithiino(2,3-b) pyrazine-2,3-dicarbonitrile (hereinafter referrred to as Compound A) and the compound 1,3-Dithiolo(4,5-b)pyrazin-2-ylidene-propanedinitrile (hereinafter Compound B) have such a desirable combination of properties.

SUMMARY OF THE INVENTION

In accordance with the invention, Compound A and Compound B individually or in combination can be utilized as the active ingredient in marine anti-fouling compositions. Also within the scope of the present invention is a method of preventing the marine fouling of surfaces that are exposed to marine organism growth, such as, for example, ship surfaces and concrete, wood and metal pier pilings. Said method comprises applying to said surfaces a water-insoluble coating composition which contains, as the active ingredient therein, an effective, or marine organism cidal, amount of either Compound A or Compound B (alternatively referred to herein as active ingredient/s).

DETAILED DESCRIPTION OF THE INVENTION

Compound A, which is utilized in the present process and compositions, has the formula:

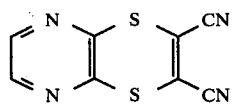

The compound is more fully described and the method of its preparation is set forth in Kurihara et al., U.S. Pat. No. 3,761,475, which is incorporated herein by reference. The compound is taught in the patent to have utility in the control of bacteria and fungi.

Compound B, a position isomer of Compound A, has the formula:

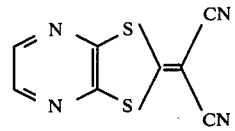

Compound B and its method of preparation are taught in Foye et al., Journal of Pharmaceutical Sciences, vol. 57, No. 9, September 1968, pp. 1611-1613. Compound B's utility as an antimalarial agent in chicks is taught in Foye et al., Journal of Pharmaceutical Sciences, vol. 64, No. 2, February 1975, pp. 211-216.

As used in this specification and the appended claims, the terms "effective amount" and "marine organism cidal amount" are interchangeable and mean the amount of active ingredient that is sufficient to keep a treated surface significantly free of marine organisms. Such amount can be readily determined by those skilled in the art by taking into consideration variables such as the rate of marine growth in the locality, length of time between treatments, nature of the composition or formulation containing the active ingredient and the like.

Both Compound A and Compound B can individually be utilized as the active ingredient in coating compositions that are useful in preventing or substantially controlling the growth of marine organisms on surfaces exposed to a marine environment. In addition to containing either Compound A or Compound B as the active ingredient therein, such coating compositions usually also will contain substantially water-insoluble binders, to thereby formulate a marine anti-foulant, water-insoluble coating composition. Vinyl resins, such as, for example, a plasticized polyvinyl chloride or a polyvinyl chloride-polyvinyl actetate, are particularly preferred as binders. Advantageously the binders are formulated as latexes or emulsions. In the finished coating compositions, amounts of active ingredient from about 1 to about 30 weight percent are advantageously used, and amounts from about 10 to about 30 weight percent of active ingredient are preferred. The following paint formulation, which utilizes Compound A as the active ingredient, is representative. The proportions given are in weight parts.

| MARINE ANTIFOULANT PAINT FORMULATION | |
|---|---|
| Compound A | 23.6 |
| Titanium Dioxide | 11.0 |
| Bentone bentonite | 0.9 |
| Trixylyl phosphate plasticizer | 2.8 |
| Vinyl resin VAGH | 8.5 |
| Rosin | 5.7 |
| Methyl isoamyl ketone | 23.75 |
| Xylol (high flash) | 23.75 |
| | 100.00 |

The vinyl resin, rosin, plasticizer and solvents are mixed together in a paint mixer and when a uniform dispersion is obtained the bentonite, titanium dioxide and Compound A are thereafter added to the vehicle with mixing to give a uniform dispersion having a solids content of approximately 39.75%. In use, for this particular formulation at least two coats at 50 microns (2 mils) per coat are used on an appropriate substrate before exposure to a marine environment.

In addition to vinyl resin binder coatings and films, epoxy and polyurethane binder compositions containing either Compound A or Compound B are useful as marine antifoulants. Coatings and films therefrom can remain substantially free from build up of marine organisms for periods ranging from about 3 to about 36 months, depending upon the concentration of active ingredient and the thickness of the applied coating or film.

The active ingredients utilized in the method of the present invention are dispersible in water or are soluble in organic solvents such as xylene, acetone, methyl isoamyl ketone or the like, and can be applied directly from these carriers. Such suspensions and solutions can be dispersed under super-atmospheric pressure as aerosols. Other liquid anti-fouling compositions suitable for the practice of this invention are emulsifiable concentrates which comprise an active ingredient, an emulsifier, and, as an inert carrier, an organic solvent of the type disclosed above. Such concentrates can be extended with water and/or oil to any desired concentration of the active ingredient for application to the surface being treated.

From the foregoing it may be seen that the active ingredients of the types hereinabove disclosed can be dissolved or dispersed in various carriers and applied to the surface being treated by brushing, spraying, soaking or the like. Since the active ingredients are substantially stable in paints, the treated surface can be painted with vinyl resin, epoxy resin or polyurethane resin base paint following treatment. Alternatively, as is discussed above, the active ingredient can be admixed with the paint composition and applied to the surface conjointly therewith. In addition, Compound A and Compound B are compatible with other anti-fouling materials can be applied to surfaces in conjunction therewith.

The following examples are intended to illustrate the compositions and processes of this invention but are representative and as such are not intended to be limiting thereof.

EXAMPLE 1

In a representative screening test of the algicidal activity of Compound A, fronds of Enteromorpha zoospores, a very common green algae that fouls the bootline on ships, were collected and air dried for a period of 24 hrs. to stress them. They were then immersed in millipore-filtered sea water with a salinity of approximately 20 ppt. (parts per thousand) at a temperature of 23° C., contained in a 1500 ml. beaker. The weight of the dried fronds was 8.3 g. After 24 hrs., the fronds were removed and a sufficient amount of filtered sea water was added to bring the total volume to 1500 ml. An algal nutrient, Murphy's Instant Ocean (MIO), was added in the amount of 3.60 ml. nutrient per 1500 ml. algal culture. MIO contains relative proportions of 100 ppm $KNO_3$, 1.0 ppm EDTA (ethylenediamine tetraacetic acid), 10 ppm Fe, $1.0 \times 10^{-3}$ ppm vitamin $B_{12}$, 0.1 ppm thiamine and 100 ppm $PO_4$. The final concentration of spores was approximately $3.5 \times 10^{-3}$/ml. A predetermined quantity of Compound A, logarithmically spaced to provide a concentration of from about 0.01 ppm to 1.0 ppm (based on the total quantity of sea water in the beaker) was added to a beaker containing algae and sea water as described directly hereinbefore, and the resulting mixture was permitted to stand at 23° C. for 14 days. At the end of the 14-day period, the nutrient media having a concentration of 1.0 ppm Compound A showed no living algal growth. At 0.32 ppm Compound A, growth was present but greatly stunted, i.e., sparse growth having a greenish-yellow color as compared with the bright vivid green in the control. At concentrations of 0.1–0.01 ppm Compound A, growth was present and abundant, comparable to the controls. Similar results were obtained with diatoms and other algae.

In a second study, Compound B was similarly shown to be an effective algicide.

EXAMPLE 2

The activity of Compound A against barnacles was tested by observing the physiological effect it had on rhythmic pacemaker-controlled pumping activity, which serves to move water in and out of the barnacle. This is a feeding and respiratory activity. This activity was monitored with a motion transducer. The barnacles so observed were obtained by placing plastic slides in a sea water canal where fouling was allowed to take place. The slides were left in the water until 20 to 100 barnacle cyprids were attached to the surface. This took from 1 to 7 days. The number of cyprids present in the plankton naturally varied from day to day. Excess material such as dirt on the slides was removed. Compound A was added to the test chamber containing the barnacles. During the first 30 minutes after the compound was added to the test chamber, the pumping first slowed and then became faster. After 2 hours, the pumping had nearly stopped and the barnacles were near death. In a second study, the slides containing the cyprids and newly metamorphosed barnacles were placed in a series of beakers, each containing a predetermined concentration of Compound A, exposed therein for 24 hours and observed until death of the barnacles. Final readings were made 2 days after exposure. In the interim, the slides were kept in troughs of running sea water. In summary, it was found that at a concentration of 2.8 ppm of Compound A the survival rate of barnacles was 10%, and at a concentration of 5 ppm there was 100% kill of barnacles.

In a second study carried out under the same conditions, Compound B was similarly shown to be effective in the kill and control of barnacles.

EXAMPLE 3

In an additional test for marine anti-foulant activity, Compound A was formulated, at a 20 percent (wt) level, into a vinyl resin based paint. This formulation was applied to a 10 cm×10 cm panel which was submersed in sea water for 60 weeks. The results were compared to an unpainted control panel, to a painted control panel having no marine antifoulant present therein, and to a panel painted with a paint formulation containing tributyltin fluoride (a standard organotin marine antifoulant), all of which were also submersed in sea water for 60 weeks. After such time, each panel was inspected for marine growth and was given a numerical performance rating, ranging from 0 to 3, which indicated its degree of resistance to various animal and plant organisms.

The ratings had the following meanings:

| Rating | Definition |
| --- | --- |
| 0 | virtually no growth |
| 1 | slight growth on edge only |
| 2 | moderate growth (i.e., ~ half panel covered) |
| 3 | complete growth (i.e., entire panel covered) |

The panels were first checked for growth of slime, brown felt and weeds, after which they were vigorously hosed down with water and then checked for the presence of barnacles, hydroids, tubeworm and mussels. The results of the study are set forth in the following table.

TABLE

| Organism | Unpainted control | Painted non-toxic control | Tributyltin fluoride control | Compound A |
|---|---|---|---|---|
| Slime | ** | ** | 2 | 0 |
| Brown felt | 0 | 0 | 2 | 0 |
| Weed | 3 | 3 | 1 | 0 |
| Barnacles | 3 | 3 | 0 | 0-1* |
| Hydroids | 0 | 0 | 0 | 0 |
| Tubeworm | 1-2 | 2 | 0 | 0 |
| Mussels | 2 | 2 | 0 | 0 |

*only on top edge of panel
**reading unable to be made because of extensive fouling

What is claimed is:

1. In a method for preventing the marine fouling of surfaces exposed to marine organism growth which comprises applying to said surfaces a water-insoluble coating composition comprising a film-forming resin, solvent and an antifouling agent; the improvement comprising, as said antifouling agent, an effective amount of a compound selected from the group consisting of p-Dithiino(2,3-b)pyrazine-2,3-dicarbonitrile and 1,3-Dithiolo(4,5-b)pyrazin-2-ylidene-propanedinitrile and mixtures thereof.

2. The method of claim 1 wherein the antifouling agent is p-Dithiino(2,3-b)pyrazine-2,3dicarbonitrile.

3. The method of claim 1 wherein the antifouling agent is 1,3-Dithiolo(4,5-b)pyrazin-2-ylidene-propanedinitrile.

* * * * *